United States Patent [19]

Snaper

[11] 4,435,719

[45] Mar. 6, 1984

[54] FLUIDIC MATRIX PRINTER

[76] Inventor: Alvin A. Snaper, 2800 Cameo Cir., Las Vegas, Nev. 89107

[21] Appl. No.: 363,461

[22] Filed: Mar. 30, 1982

[51] Int. Cl.[3] .............................................. G01D 15/18

[52] U.S. Cl. ........................................................ 346/75

[58] Field of Search ............................ 346/1.1, 75, 140

[56] References Cited

U.S. PATENT DOCUMENTS

| | | | |
|---|---|---|---|
| 3,152,858 | 10/1964 | Wadey | 346/75 |
| 3,373,437 | 3/1968 | Sweet et al. | 346/75 |
| 3,373,438 | 3/1968 | Hochberg | 346/75 |
| 3,512,173 | 5/1970 | Damouth | 346/75 |
| 3,719,952 | 3/1973 | Elbaum | 346/75 |
| 3,797,022 | 3/1974 | Beam et al. | 346/75 |
| 4,189,734 | 2/1980 | Kyser et al. | 346/140 PD X |
| 4,353,079 | 10/1982 | Kawanabe | 346/140 PD |

*Primary Examiner*—Donald A. Griffin
*Attorney, Agent, or Firm*—Donald D. Mon

[57] ABSTRACT

A fluidic matrix printer comprised of an array of fluidic elements arranged to provide a fluidic printing head through which printing ink is constantly circulated from a reservoir. Electrodes on the fluidic elements provide a bias to deflect the flow path causing the fluidic element to emit a drop of printing fluid. The fluidic elements are individually energized through a switching circuit which interfaces the fluidic elements with a character generator. A paper drive system feeds paper past the fluidic printing head printing out the information from the character generator. The fluidic array can be arranged to print single letters, entire lines or entire pages, if desired.

9 Claims, 3 Drawing Figures

FLUIDIC MATRIX PRINTER

FIELD OF THE INVENTION

This invention relates to printing devices and more particularly relates to a fluidic printer comprised of a plurality of fluidic elements arranged in a matrix array.

BACKGROUND OF THE INVENTION

Printing devices include printing presses which print from an ink surface such as type, plates, wood blocks, etc. operating by pressure, either against a flat bed as in a platen press or against a series of revolving cylinders as in a rotary press. Usually these type of devices involve a great amount of typesetting and preparation in order to produce printed material. The intermediate step of typesetting such as preparing a platen or cylinder necessarily slows down the process and increases the expense. Recent improvements have evolved what is referred to as instant printing. The instant printing press still requires a certain amount of typesetting and utilizing rotating cylinders, however.

Recent developments in electronics have also permitted electronically operated typewriters in which text is stored in an electronic memory and then automatically printed on command. These devices utilize dot matrix printers or daisy wheel printers in which the text is printed out one letter at a time. While this particular type of printing process increases the production over single hand typed documents it is not generally efficient enough for mass producing a number of documents.

It would be advantageous if the electronics of the computer type devices could be utilized to operate a printing head suitable for mass production of documents, letters, etc.

BRIEF DESCRIPTION OF THE INVENTION

It is the purpose of the present invention to provide a fluidic matrix printer which employs electronic memory devices and computers presently available, to operate a fluidic matrix printing head for mass production of documents.

The matrix printing head of the present invention is comprised of a plurality of fluidic elements arranged in a matrix array which when energized will produce dots representing a character or an entire line of text. The matrix array of fluidic elements are activated by a character generator device interfaced to the matrix array by a switching circuit such as an electronic gating device. Each element of the matrix array has continuously flowing printing fluid and is electrically connected through an interface to the character generator. When a pulse is applied to one or more of the fluidic elements the flow of printing fluid is deflected out a port to produce a dot. A plurality of these fluidic elements appropriately arranged can produce an entire letter, line or even an entire document almost instantaneously.

Printing fluid is circulated from a reservoir by a pump through the array of fluidic elements and continues to circulate as long as the printer is in operation. Dots are generated by applying an electrical signal to the control port of a selected fluidic element causing printing fluid flow to be deflected through a port onto paper or other media passing beneath the fluidic array. The flow is deflected by a change in pressure caused in the fluid passageways of the fluidic element. The fluidic elements may be selected to print a dot less than approximately 0.010 inches in width. The fluid elements are connected in parallel to the common supply of printing fluid or ink and are capable of being actuated independently in any combination when an electric signal is applied at a control port.

With the fluidic printer as disclosed and described herein, the printing speed is on the order of one $8\frac{1}{2}\times 11$ inch page per second. The paper is passed beneath the fluidic printing head by some means such as a belt drive. The paper selected for use in this printer can be from 1 inch width to 120 inch width with the length unlimited. The paper transport could be in roll form with the paper passed beneath the fluidic matrix printing head and controlled or synchronized by a signal from the interface circuit.

It is therefore an object of the present invention to provide a printing system in which a fluidic printing head responds to the output of a word or character generator to instantly reproduce the stored text material.

Another object of the present invention is to provide a printing system in which text material is continuously printed on paper passed beneath a fluidic printing head.

Another object of this printing system is the production of a fluidic printing element comprised of a plurality of fluidic elements connected to a common supply source capable of being activated independently.

The above and other features of the invention will be fully understood from the following detailed description and the accompanying drawings, in which:

DETAILED DESCRIPTION OF THE INVENTION

Figure 1:
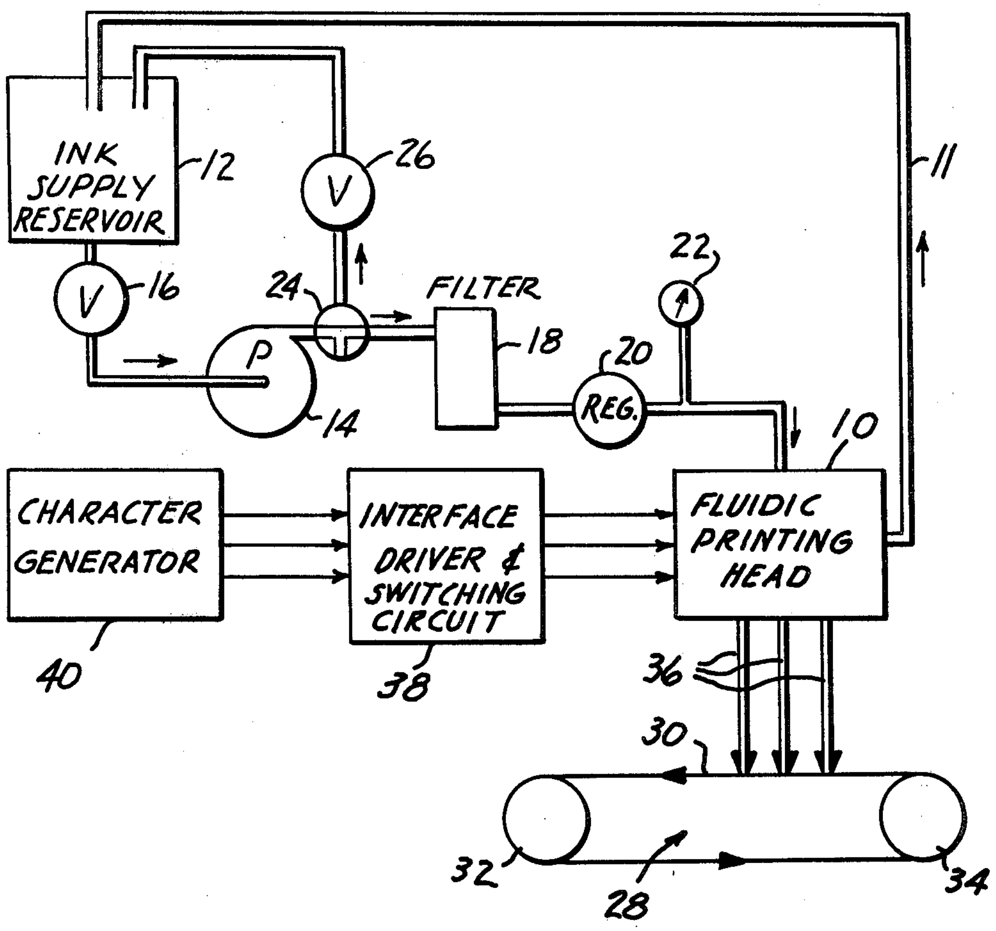
FIG. 1 is a simplified block diagram illustrating the arrangement of the elements of the invention.

The fluidic matrix printer of the present invention is generally illustrated in block diagram form in FIG. 1 and is comprised of a plurality of fluidic elements arranged in a matrix array 10, connected to an ink supply reservoir 12 through a pump 14. The system will be arranged to continuously circulate printing fluid or ink from reservoir 12 through a check valve 16 to a filter 18 for delivery to the fluidic printing head 10.

The fluidic dots printed by the fluidic printing head 10 will be controlled by maintaining the viscosity of the ink supply and controlling the pressure by regulator 20 and gauge 22. The supply pressure range of the ink from reservoir 12 and the size of the ports in the fluidic elements of the fluidic printing head 10 will be selected to provide a printing "dot" of less than approximately 0.010 inches in width. A flow control valve 24 and another check valve 26 will be provided to divert the flow of ink supply back to the reservoir to by-pass the fluidic printing head 10 for repair and maintenance procedures.

The fluidic printing head is comprised of readily available fluidic components which can form the dot printing function described above. All the fluidic printing elements or components are biased fluidic flip-flop elements of the beam deflection type. That is, with a constant flow of printing fluid through the fluidic elements a bias signal applied to the control port will cause a drop of the printing fluid to be deflected through a ported line.

Paper will be passed beneath the fluidic printing head 10 by means of a paper transport system 28 comprised of a paper drive which may be in the form of a belt passed around drive rollers 32 and 34. Various types of paper may be used such as widths of 1 to 120 inches of unlimited length and roll form if desired.

Printing is accomplished by generating an ink dot from port represented at 36 in fluidic printing head 10 in response to an electrical signal applied to the individual fluidic elements through an interface driver and switching circuit 38. The interface driver and switching circuit 38 responds to the output from the character generator 40 to apply bias signals to the independently activated fluidic elements forming the array in the fluidic printing head 10. The character generator may be the type which configures the matrix of fluidic elements into dots having the font set desired. This can be in the form of a read only memory (ROM) chip which is modular in nature so as to provide selectability between different font sets and/or graphic capability. One such character generator is a model DM8678 manufactured by National Semiconductor. The character generator may also contain a character buffer and/or a control capable of being processed through more than one interface driver and switching circuit 38. Thus the character generator could be arranged to activate a plurality of fluidic printing heads or a plurality of matrix arrays of fluidic elements forming the fluidic printing head 10.

Several different approaches to the electro-fluid interface of the interface driver and switching circuit 38 can be utilized. One of these would be a switching circuit which would include an operational amplifier chip to drive the fluidic subassembly with a compatible signal generator from the character generator 40. Other approaches could be the use of a piezo-electric switching element or an electro-magnetic deflection member. Arc-actuated or electrostatic switching elements could also be used.

As was indicated above, the relationship of the ink viscosity, fluidic output port 36 and the paper position on paper transport 28 is carefully controlled. The fluidic printer positions the printing paper at uniform distances from the orifices of the fluidic output channels or ports 36. Ink viscosity is adjusted so that the volume of ink dispensed from each fluidic output orifice is sufficient to produce a solid mark without excess that might cause running or smearing. When the output ports 36 are not in an activated stage the ink supply is prevented from running out of the port by the absence of pressure and the meniscus of the fluidic ink. Thus the fluidic ink is constantly circulating from the ink supply reservoir 12 through the fluidic printing head 10 back to the reservoir through conduit 11.

Figure 2:
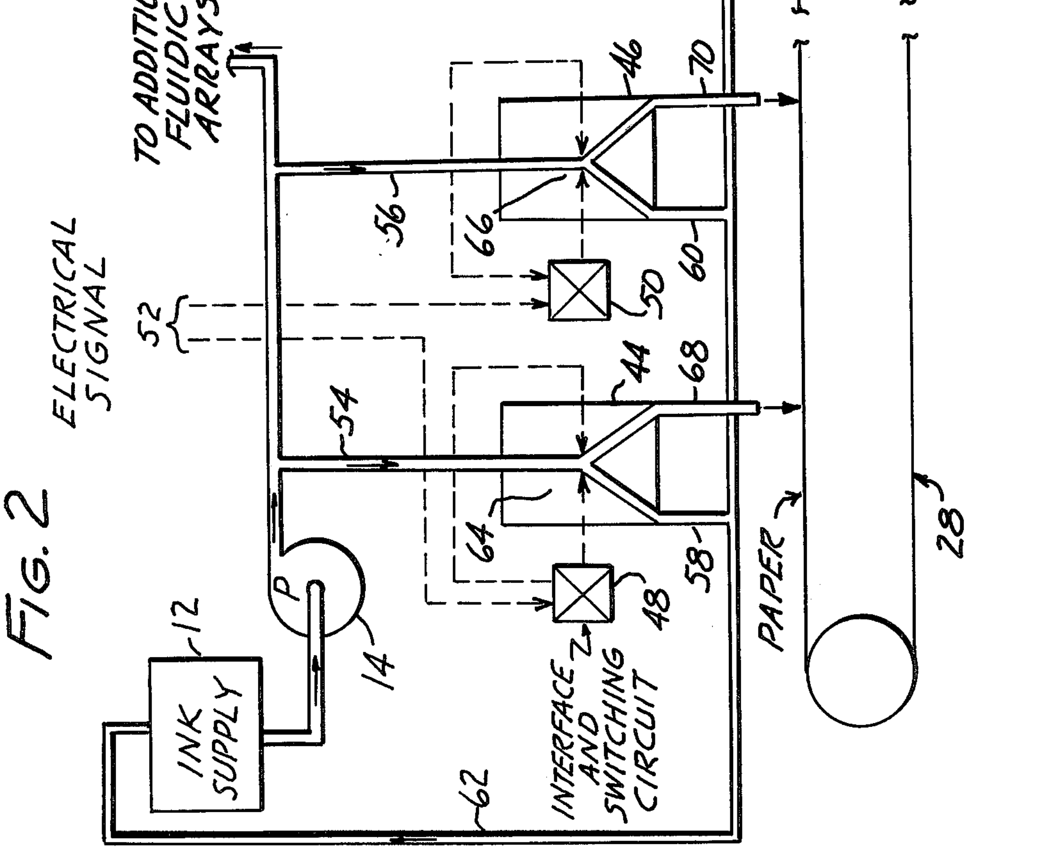
FIG. 2 is a semi-schematic diagram illustrating the operation of the fluidic printer.

The application of the bias signals from the interface circuit to activate the fluidic printing heads is illustrated in the schematic diagram of FIG. 2. Ink is supplied from reservoir 12 through pump 14 to a plurality of fluid element arrays or printing heads 44, 46, etc. Each of these arrays is connected in parallel to separate interface and switching circuits 48 and 50. The character generator 40 provides an electric signal at 52 through each of the interface and switching circuits 48 and 50 to activate pre-selected fluidic elements in the array 44, 46 to reproduce the output of the character generator on paper passed beneath the printing heads by paper transport 28. Normally the ink supply flows from reservoir 12 through pump 14 to lines 54 and 56 connected to fluidic arrays 44 and 46. Without any signal being applied to the fluidic arrays the ink is returned through lines 58, 60 and 62 to the ink supply reservoir 12. When a signal representing a character, line, or group of figures is received at 52, it activates one or more of the interface switching circuits applying a bias signal at 64 and/or 66 of the fluidic arrays. This causes deflection of the ink supply to ports 68 or 70, printing a dot on paper carried by paper transport 28. With activation of the preselected fluidic elements, printing of letter, lines diagrams, or any type of form provided by the character generator may be provided.

Figure 3:
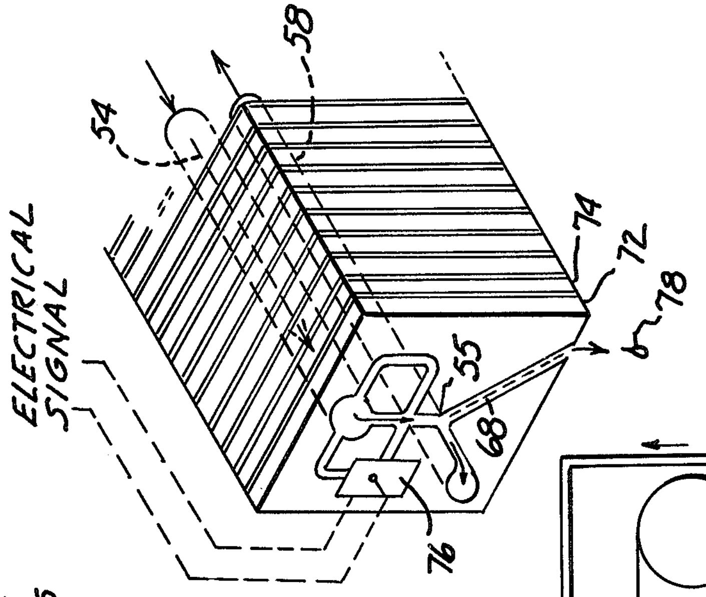
FIG. 3 is a partial section illustrating an array of fluidic elements.

An array of fluidic elements connected in parallel to form a fluidic printing head is illustrated in FIG. 3. In this figure a plurality of fluidic elements 72, 74, etc., are connected in parallel so that inlet ports form the line 54 and their outlet ports from the line 58. Normally the ink supply flows through 54 down through passageway 56 to outlet port 58. However, when an electrical signal is received and applied to electrodes 76 on either side of the fluidic element, the pressure in the passageway 55 is changed causing the ink supply to be deflected out of line 68 producing a drop 78 onto paper delivered by paper transport 28. The electrodes 76 on each side of each fluidic element represent one intersection of the matrix array of fluidic elements. Thus, by activating appropriate selected fluidic elements representing intersections of the matrix array, a predetermined pattern of dots can be produced representing the output of the character generator. The number and arrangement of fluidic arrays will be determined by the size of the paper, printing speed desired, and the number of interface switching circuits which can be accommodated by the character generator.

As was described previously, the character generator configures the matrix of dots in the font set desired. Since the character generator has the capability of selecting upper or lower case characters, by changing the most significant 6th or 7th ASC II bit, the character generator can provide selectibility between different front ses and/or graphic reproduction capabilities. The output signal of the character generator is serial data which is conditioned or switched by the interface circuit to sweep the particular array or set of fluidic elements to generate the characters, words, or text material desired.

Thus there has been described a novel, fluidic printing system utilizing fluidic elements interfaced to a character generator providing a unique, electronic fluidic printing system. The system is designed to print in alpha numerics or graphics in a wide variety of styles as well as on different sizes of paper in unlimited length, with roll form utilized if desired. Further, with appropriate design of separate reservoirs and tubing, the system can easily be adapted to print single or multi-colors.

This invention is not to be limited by the embodiment shown in the drawings and described in the description, which is given by way of example and not of limitation, but only in accordance with the scope of the appended claims.

I claim:

1. A fluidic printing apparatus comprising;

a plurality of fluidic printing elements arranged in an array; said fluidic printing elements being biased beam deflecting type fluidic flip-flop elements;

a fluid circulating means for circulating printing fluid through said array of fluidic printing elements;

paper transport means for transporting paper past said array of fluidic elements; and electronic means for selective electronic activation of said beam deflecting fluidic printing elements to discharge said printing fluid unto said paper in a predetermined pattern.

2. The apparatus according to claim 1 in which said plurality of fluidic elements are connected in parallel to said fluid circulating means.

3. The apparatus according to claim 1 in which said fluid circulating means comprises;

a reservoir containing printing fluid;

a pump;

conduit means connecting said reservoir to said fluidic elements through said pump; and second conduit means connecting said fluidic elements back to said reservoir in a closed loop whereby printing fluid may be constantly circulated through said array of fluidic elements.

4. The apparatus according to claim 1 in which said means for selectively activating said fluidic printing elements comprises:

character generating means;

interface driver and switching circuit means connecting said character generating means to said array of fluidic elements; and said interface driver and switching circuit means selecting and activating the fluidic elements in said fluidic array according to the output from said character generating means.

5. The apparatus according to claim 1 in which said plurality of fluidic elements are arranged in a matrix array and said interface driver and switching circuit are adapted to activate selected fluidic elements representing intersections of the matrix array to produce a predetermined pattern.

6. The apparatus according to claim 4 in which said interface driver and switching circuit means is comprised of a piezo-electric switching element means.

7. The apparatus according to claim 4 in which said interface driver and switching circuit means is comprised of an electro-magnetic deflection means.

8. The apparatis according to claim 5 in which said interface driver and switching circuit means is comprised of a piezo-electric switching element means.

9. The apparatus according to claim 5 in which said interface driver and switching circuit means is comprised of an electro-magnetic deflection means.

* * * * *